United States Patent [19]
Weaver

[11] Patent Number: 5,703,566
[45] Date of Patent: Dec. 30, 1997

[54] ANTI-SHOPLIFTING SECURITY SYSTEM

[76] Inventor: Jon Neal Weaver, 1511 NW. 35th Terrace, Gainesville, Fla. 32605

[21] Appl. No.: 699,880

[22] Filed: Aug. 16, 1996

[51] Int. Cl.$^6$ .................................... G08B 13/14
[52] U.S. Cl. .............................. 340/572; 340/551
[58] Field of Search ............................. 340/572, 551

[56] References Cited

U.S. PATENT DOCUMENTS

| | | | |
|---|---|---|---|
| 4,710,752 | 12/1987 | Cordery | 340/572 |
| 4,779,076 | 10/1988 | Weaver | 340/572 |
| 4,791,412 | 12/1988 | Brooks | 340/572 |
| 5,005,001 | 4/1991 | Cordery | 340/551 |

*Primary Examiner*—Thomas Mullen
*Assistant Examiner*—Sihong Huang
*Attorney, Agent, or Firm*—Saliwanchik, Lloyd & Saliwanchik

[57] ABSTRACT

This invention relates to detecting the presence of a soft magnetic marker in an interrogation zone. A low frequency electromagnetic field is produced utilizing dual frequency generators causing the magnetic marker to produce a phase shift of the modulation of transmission harmonics. These signals are readily distinguished from ferrous alloys and noise.

23 Claims, 1 Drawing Sheet

ANTI-SHOPLIFTING SECURITY SYSTEM

BACKGROUND OF THE INVENTION

This invention relates to electronic article surveillance (EAS) systems. These systems are often used to detect shoplifters or otherwise monitor the movements of tagged articles. The EAS systems of the type to which the subject invention is directed, are generally employed to detect the presence of a magnetic marker in a magnetic field. Such systems thus include a device, for example, a generating coil, for generating the magnetic field, and another device, for example, a receiving coil, for detecting signals generated when a marker is passed through the field.

Prior disclosed EAS systems, for example, in U.S. Pat. Nos. 4,710,752 and 5,005,001, have found that the generation of two overlapping magnetic fields, having substantially different frequencies and substantially different amplitudes, results in a greater ability to detect a marker in the magnetic field. Specifically, the ability of these EAS systems to detect the presence of a marker, in the presence of noise, is enhanced by generating the magnetic field with more than one frequency component. The ferromagnetic marker, in the presence of this magnetic field, produces output pulses at the frequency of the higher frequency field component and its harmonics which are modulated by the lower frequency component and its harmonics. The use of two overlapping magnetic fields of substantially different frequency and amplitude thus enables detection of smaller tag signals and/or increased spacing between the transmitter and the receiver. Even so, these EAS systems can not provide transmitter-to-receiver spacing greater than about 1.2 meters.

EAS systems must comply with the rules of various agencies, e.g. the Federal Communications Commission. These agency rules can, for example, limit the amount of spurious emissions and the amount of electromagnetic interference (EMI) allowable. Additionally, the performance requirements of EAS systems can include limitations on the number of false alarms from noise or metallic objects, transmission energy, and an ability to control large interrogation zones. Current EAS systems based on low frequency electromagnetic transmission can not meet all of these performance requirements while simultaneously satisfying the spurious emissions and EMI limitations, due to the rapid attenuation of the transmitted signal.

The proliferation of electrical noise in retail environments greatly decreases the probability of detecting the weak signals from markers. Therefore, while improvements have been made in increasing the size of interrogation zones, current electromagnetic EAS systems have not been able to surpass about 1.2 meters in size of interrogation zone while maintaining reliable performance. Therefore, there exists a need for low frequency electromagnetic EAS systems which can utilize low transmission power, operate in an environment with high noise levels, and still detect a marker in an interrogation zone of two or more meters.

BRIEF SUMMARY OF THE INVENTION

The subject invention pertains to novel Electronic Article Surveillance (EAS) systems which are able to detect tagged articles with a reduced incidence of false alarms even in wide interrogation zones and in the presence of noise. Advantageously, the systems of the subject invention can operate at lower power than current systems. In a specific embodiment, an electromagnetic field is created as a superposition of two individual fields generated with two transmitters, close in frequency and approximately equal in amplitude. When a ferromagnetic marker is brought into the interrogation zone, i.e., into the magnetic field, the marker generates amplitude modulated harmonics of each of two individual fields, wherein each marker generated amplitude modulated harmonic is phase shifted. The presence of a marker is then determined by detecting the presence of a phase shift in an amplitude modulated harmonic. The detection of this phase shift by the receivers, greatly reduces the probability of detecting a random noise signal, as well as minimizes false alarms due to ferrous objects having greatly different phase responses from that of an intended marker.

To insure that markers can be highly differentiated from other metallic objects and to maximize the transmission field intensity and marker detection, each transmitter and its associated receiver are separated by the interrogation zone.

DETAILED DESCRIPTION OF THE INVENTION

Figure 1:
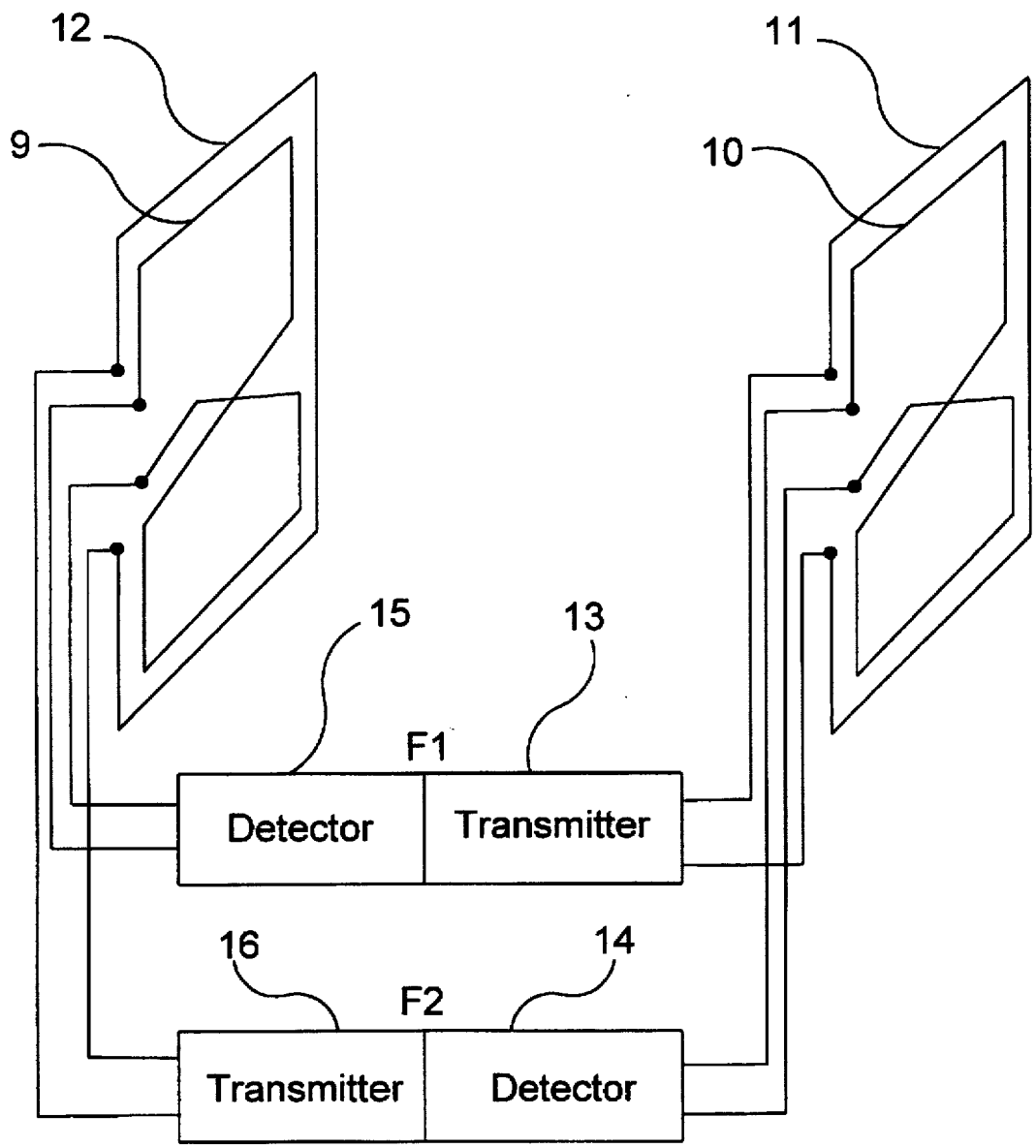
FIG. 1 is an Electromagnetic Surveillance System is shown in block diagram form including a perspective view of the arrangement of antennas around an interrogation zone.

The subject invention pertains to Electronic Article Surveillance (EAS) systems incorporating two transmitter-receiver pairs, operating at different frequencies, wherein the transmitter and receiver of each pair are separated by the interrogation zone. It is preferable for each transmitter to be of a single coil design. An EAS system of the subject invention used to detect a marker in the interrogation zone is shown, schematically, in FIG. 1. In a specific embodiment, the system of the subject invention can comprise a pair of antenna arrays each comprising a transmitting coil 11, 12 and a receiving coil 9, 10. In a specific embodiment, transmitting coil 11, preferably of a single coil design, is connected to a first field generator 13, that can produce an output equivalent to less than about 50 Watts rms, and preferably less than about 25 Watts rms. In a specific embodiment, the frequency of a transmitting coil is approximately 1 kHz (F1). Associated with the transmitter coil 11 is a receiver coil 9, which is parallel to the transmitter coil 11 and separated from transmitter coil 11 by the interrogation zone. The receiver coil 9 is connected to detector 15, which employs circuitry to detect a marker.

A second transmitter coil 12, preferably of a single coil design, is connected to a second field generator 16, which is about 3 to about 50 Hertz lower or higher in frequency (F2) than the frequency (F1) produced by the first field generator 13. The receiver coil 10 is connected to a detector 14, which is substantially equivalent to detector 15. Accordingly, there are components of two transmitter-receiver systems that operate at slightly different frequencies with associated transmitters and receivers separated by an interrogation zone.

The transmit fields developed by coils 11 and 12 and associated generators vectorially add or cancel, for all orientations, in the interrogation zone. The ratio of the amplitudes of the transmit fields is in the range of about 1:1 to about 1.5:1, and preferably about 1:1. A marker passing through the interrogation zone produces harmonics which are amplitude modulated at a rate determined by the difference in transmission frequency [F1–F2] and which are phase shifted due to inherent material properties of the marker. Since all generators produce harmonics of the transmitted fundamental, the receives coils 9 and 10 are positioned away from their associated transmitters on opposite sides of the interrogation zone. The detector 14 can utilize narrow band harmonic filters to minimize out-of-band signals such as the harmonics being transmitted by the adjacent coil 11. Detector 15 functions in an equivalent manner.

In-band signals passed through harmonic filters in each detector are demodulated and the modulation compared in phase with a reference signal. Since both detectors and their associated generators are phase locked together, phase comparison is relatively simple and when present conditions are met, an alarm is activated. In a specific embodiment, the reference signal, both detectors, and both transmitters are phase locked.

The advantages of this surveillance system are that the transmit field is maximized in all orientations creating a large interrogation zone and the detection of phase shifted amplitude modulated harmonics greatly reduces false alarms due to noise.

I claim:

1. A system for detecting the presence of a ferromagnetic marker in an interrogation zone, comprising:

a first generating means for generating a first magnetic field in the interrogation zone at a first frequency;

a second generating means for generating a second magnetic field in the interrogation zone at a second frequency;

a detecting means for detecting a phase shift of a signal produced by a ferromagnetic marker present within the interrogation zone;

wherein said second frequency is about 3 to about 50 hertz lower or higher than said first frequency.

2. The system, according to claim 1, wherein the ratio of the amplitudes of said magnetic fields is in the range from about 1:1 to about 1.5:1.

3. The system, according to claim 1, wherein the ratio of the amplitudes of said magnetic fields is about 1:1.

4. The system, according to claim 1, wherein said first and second generating means are each of a single coil design.

5. The system, according to claim 1, wherein said signal is an amplitude modulated signal.

6. The system, according to claim 5, wherein said signal is an amplitude modulated harmonic.

7. The system, according to claim 6, wherein said signal is an amplitude modulated harmonic of either said first or said second magnetic field.

8. A system, according to claim 1, wherein said first and second generating means and said detecting means are phase locked.

9. A system, according to claim 1, wherein said detecting means comprises a reference signal for comparison of the phase of said signal to said reference signal.

10. The system, according to claim 1, wherein said interrogation zone is greater than about 1.5 meters.

11. The system, according to claim 1, wherein said first and second generating means produce an output of less than about 50 watts rms each.

12. The system, according to claim 1, wherein said first and second generating means produce an output of less than about 25 Watts rms each.

13. A method for detecting the presence of a ferromagnetic marker in an interrogation zone, comprising the steps of:

generating a first magnetic field in the interrogation zone at a first frequency;

generating a second magnetic field in the interrogation zone at a second frequency;

detecting a phase shift of a signal produced by a ferromagnetic marker present within the interrogation zone;

wherein said second frequency is about 3 to about 50 hertz lower or higher than said first frequency.

14. The method, according to claim 13, wherein the ratio of the amplitudes of said magnetic fields is in the range from about 1:1 to about 1.5:1.

15. The method, according to claim 13, wherein the ratio of the amplitudes of said magnetic fields is about 1:1.

16. The method, according to claim 13, wherein the steps of generating a first magnetic field further comprises generating said first magnetic field with a single coil design generating means, wherein the step of generating a second magnetic field further comprises generating said second magnetic field with a single coil design generating means.

17. The method, according to claim 13, wherein said signal produced by a ferromagnetic marker present within the interrogation zone is an amplitude modulated signal.

18. The method, according to claim 17, wherein said amplitude modulated signal is at a frequency which is an amplitude modulated harmonic of either said first or said second magnetic field.

19. The method, according to claim 16, wherein the step of detecting a phase shift of said signal further comprises comparing the phase of a reference signal to the phase of said signal.

20. The method, according to claim 19, wherein said first and second generating means and said reference signal are phase locked.

21. The method, according to claim 13, wherein said interrogation zone is greater than about 1.5 meters.

22. The method, according to claim 13, wherein said first and second generating means produce an output of less than about 50 watts rms each.

23. The method, according to claim 13, wherein said first and second generating means produce an output of less than about 25 Watts rms each.

* * * * *